Oct. 17, 1967  T. CYMMER ET AL  3,347,526
GUIDE FOR FAIRED CABLE
Filed Nov. 16, 1966
2 Sheets-Sheet 1
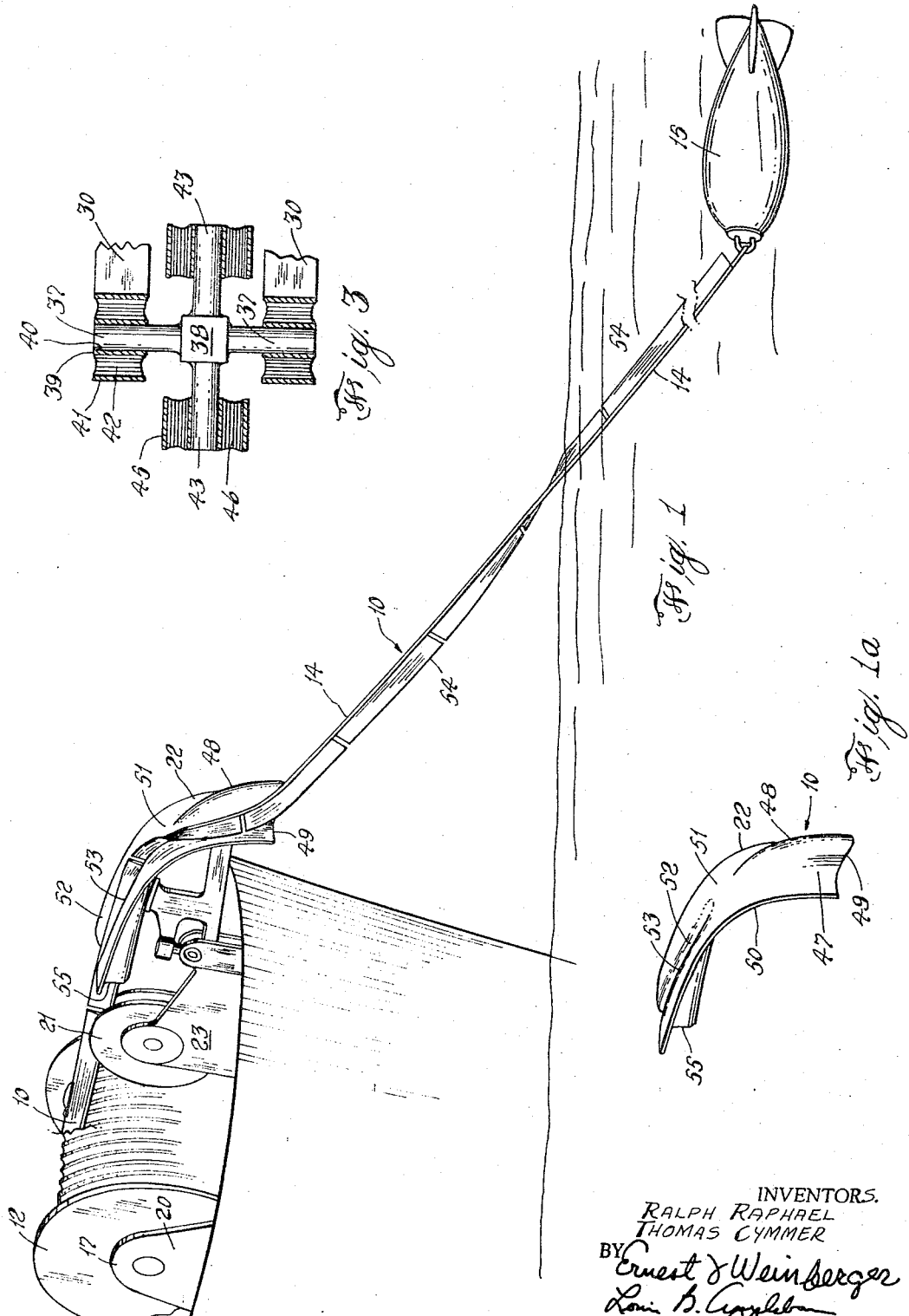
INVENTORS.
RALPH RAPHAEL
THOMAS CYMMER
BY Ernest J Weinberger
Louis B. Appleton
ATTORNEYS

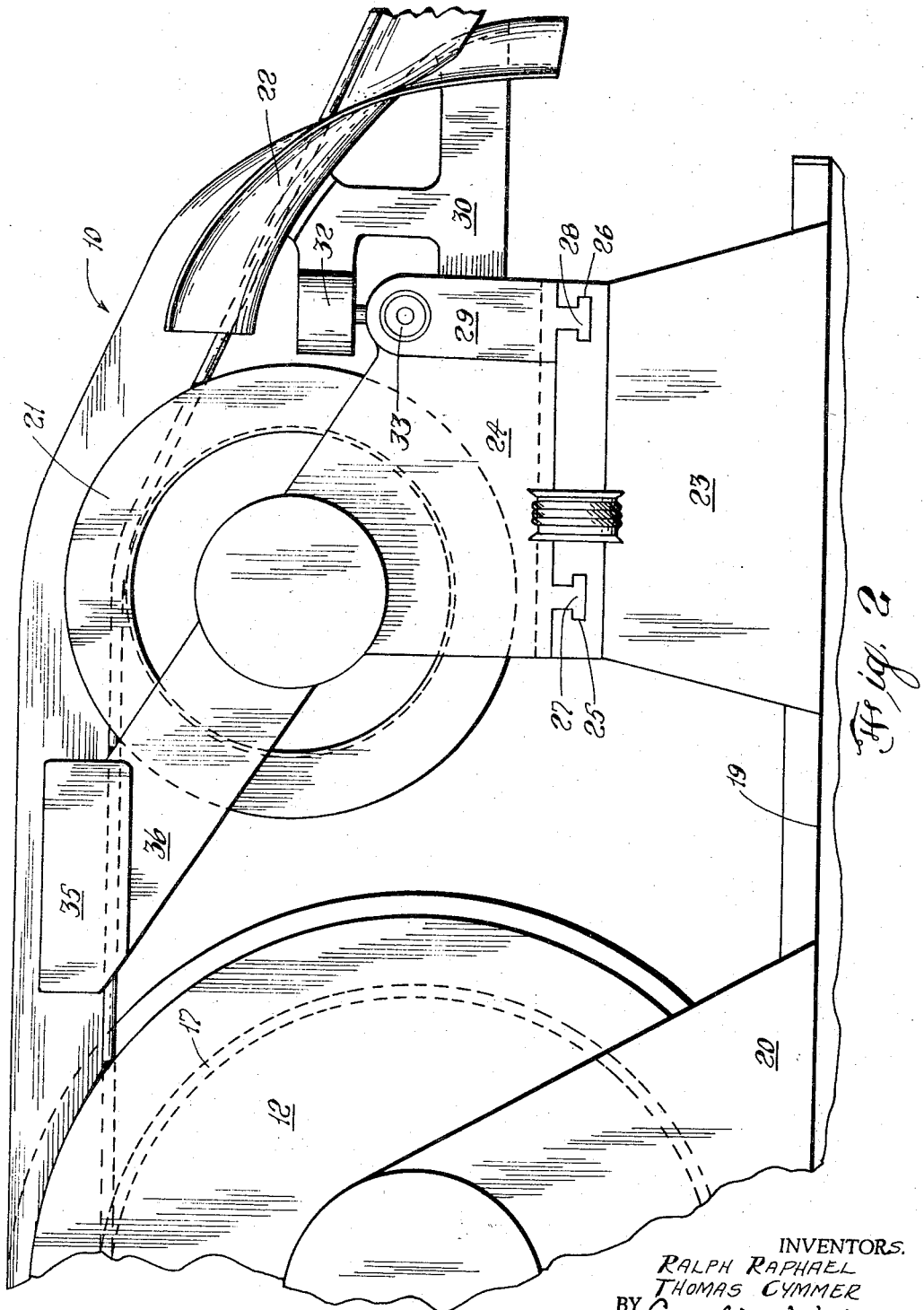

United States Patent Office 3,347,526
Patented Oct. 17, 1967

3,347,526
GUIDE FOR FAIRED CABLE
Thomas Cymmer, Jersey City, N.J., and Ralph Raphael, Brooklyn, N.Y., assignors to the United States of America as represented by the Secretary of the Navy
Filed Nov. 16, 1966, Ser. No. 595,320
5 Claims. (Cl. 254—190)

ABSTRACT OF THE DISCLOSURE

The disclosure herein contemplates an erecting guide for a "continuous type" faired cable which is contoured to accept the faired cable after it has left the water and properly position the cable for disposition thereof on and off a storage drum. Additionally, the guide is supported for yielding motion in two planes of freedom in order to permit alignment with the cable.

The invention described herein may be manufactured and used by or for the Government of the United States of America for governmental purposes without the payment of any royalties thereon or therefor.

This invention relates to improvements in the handling of ship's faired towing cables and more particularly to structures for properly guiding and erecting faired cables while they are being payed out and hauled aboard the towing vessel.

In naval applications where bodies are towed under water at relatively high speeds, the cable must be provided with a fairing in order to overcome some of the problems inherent in such operations. The fairing itself introduces several other inherent difficulties one of which is storage on a drum and removal therefrom. The presence of the fairing permits only a single layer winding and limits to some extent the closeness of the adjacent windings. The handling of the cable itself becomes troublesome since the fairing has a tendency to twist and curl upon its removal from the water. The entire problem is simply one of handling the faired cable.

The present practice is to haul up and lower the cable over a towing sheave and manually uprighting the fairing during this operation. In addition, the cable is manually guided on and off the storage drum. This system is highly inefficient and results in extremely loose and inaccurate drum windings. As a result, at times, the operation must be terminated in order to permit manual correction. Not only is this time consuming, but it also requires the continual presence of trained personnel.

In view of the foregoing, it is an object of this invention to provide an efficient, simple, reliable, automatic and inexpensive guide for the erection and storage handling of towing faired cables.

Another object is to provide an erection guide for faired cable which will automatically compensate for various cable towing angles in order to reduce cable tension and damage thereto in handling.

A further object is to provide an overall faired cable handling structure capable of properly guiding the cable between the storage drum and the water.

Other objects and advantages will appear from the following description of an example of the invention, and the novel features will be particularly pointed out in the pointed out in the appended claims.

In the accompanying drawings:
FIG. 1 is a perspective view of an embodiment of the invention mounted on a ship during a towing operation;
FIG. 1a is a perspective of the guiding device;
FIG. 2 is a side elevation of the faired cable erecting structure and the co-acting parts used therewith; and,
FIG. 3 is a sectional view taken approximately along 3—3 of FIG. 2 showing the torsional springs supporting the erection guiding device.

In the illustrated embodiment of the invention as shown in FIG. 1, a faired cable 10 is being hauled aboard a ship 11 for storage on a powered storage drum 12. The cable illustrated has a "continuous" flexible fairing. The term "continuous" refers to the fact that although the cable fairing portions are separate, they extend longitudinally for a substantial distance, namely, a minimum of 15 feet. The fairing portions 13 are individually affixed to the cable, rope or strength member 14 by way of a nose piece which protects the cable and permits rotation of the fairing thereabout. Clamps or other suitable restraining means are provided to prevent the fairing from moving lengthwise along the cable 14. As is evident, the fairing, under the action of water currents and other environmental forces, is subject to intensive twisting forces. In order to minimize these effects and to prevent excessive damage, the fairings are separated from each other by a short spacing. This separation also facilitates storage thereof on a circular drum of minimum diameter.

Prior to the instant invention the faired cables were hauled aboard ship by providing a towing sheave which extended over the stern section of the ship and during this operation, personnel were stationed along the path of the faired cable to manually restrain the cable from twisting and to properly position it for storage on a drum. This operation was not only time consuming and costly but also required a large storage drum since the cable was extremely difficult to handle due to the weight of the towed body carried by the cable.

It should be noted that, in general, the ship 11 is under way during the hauling and paying-out of the cable, and therefore the cable does not extend vertically from the ship. The depending and sidewise angles of the cable vary to some extent on a number of factors, which include the speed of the ship, the sea state, the depth of the towed body 15 and its configuration and weight. The fairing 13 trails the strength member for that portion of the faired cable which is below the waterline, while for that portion which is disposed between the water and the ship, the fairing 13 depends below the cable due to the gravitational forces acting thereon. Therefore, at some point, generally designated at 16, the cable is twisted about the strength member. The opposite end of the faired cable is affixed to the storage drum 12 with the strength member proximate the inner diameter 17, which is provided with helical circumferential grooves for positioning and aligning the strength member. The cable is stored with the fairing extending outwardly as shown. The drum 12 is positively rotationally driven (means not shown) to draw thereon the faired cable about its center 18, and is structurally supported on the deck 19 by drum brackets 20.

From the above, it is clear that the faired cable must be rotated approximately 180° and aligned with the drum 12 in order that it might be properly placed thereon. For this purpose, there is interposed in the path of the towline (faired cable) between the drum 12 and the stern of the ship, a towing sheave 21 and a cable erecting and guiding device 22. Referring now also to FIG. 2, both the sheave 21 and the guiding device 22 are both supported by a guide bracket 23 fixed to the ship's deck 19 with the device 22 extending over the end of the stern. The bracket 23 carries a carriage 24 having a pair of longitudinally extending guideways 25 and 26 into which extend mating guides 27 and 28 depending from carriage 24. This permits the entire carriage to move transversely of the ship. The carriage, in turn, supports the sheave 21 and the base support 29 which is tied to the guiding device 22 via frame 30 to form a unitary structure for support thereof. The frame support 30 is more specifically fixed to the base 29 through a pair of pivotal supports 31 and 32. The pivot at 33 permits the guiding device limited rotation about an axis transverse to the ship while the other support 32 permits rotation about a vertical axis perpendicular thereto. The device is therefore provided with two mutually perpendicular degrees of freedom in addition to the transverse coupled motion.

Although not shown in detail, the carriage is provided with a drive drum 34 which is coupled to the storage drum drive so that the transverse motion of the carriage 24 will move the sheave and guiding device to wind a single layer on the drum 12. This acts in much the same manner as the ordinary fishing reel. Additionally, a guide trough 35 carried by the sheave 21 through support 36 is disposed intermediate the sheave 21 and the drum 12. Since the separation therebetween varies from installation to installation to guide trough serves to maintain the position of the faired cable prior to storage. The inner contour of the trough conforms generally to the fairring and holds it erect.

FIG. 3 illustrates one form of a yielding pivot arrangement which is provided with a spring-like return component. The vertical pivot 32 is about a support shaft 37 which extends on opposite sides of hub 38. Disposed coaxially therewith is an inner cylinder 39 whose inner wall 40 is fastened to the outer surface of the shaft 37. Between an outer coaxial cylinder 41 and the inner cylinder 39 there is tightly confined an elastomeric material 42. This outer cylinder is affixed to the support frame 30 so that as the frame is deflected, a restraining force is exerted by the elastomeric torsion spring 42 which is under a shear or twisting force. This is effectively a return spring type action. The same form of arrangement is applied to the other pivot 31 where its shaft 43 extends laterally from the hub 38 and embodies the elastomeric torsion spring which consists of an inner cylinder 44, an outer cylinder 45 and having confined therebetween an elastomeric insert 46. Thus the two restraining pivots in conjunction with their common hub yielding hold the guiding device 22 in proper alignment for receiving a faired cable which extends in a line longitudinally of the ship.

Referring again to FIGS. 1, 1a and 2, the guiding device 22 which is shown as a unitary structure may be subdivided into functional portions for explanatory and descriptive purposes. The leading portion generally designated at 47 and referred to as the initial upstanding deflecting portion is provided with a centrally oriented longitudinally hump or rounded flange 48. The deflecting flange 48 is highest or furthest from the general surface at the leading edge 49 and diminishes toward the surface as one proceeds away from the leading edge. This is a uniform and continuous smooth transition. The overall general contour of the guiding device 22 can be described as arcuate as seen when viewed edgewise along the edge 50. More specifically, an elliptical shape has been found to provide satisfactory performance. The central portion 51 provides a relatively smooth transition between the deflecting portion 47 with its rounded flange and the channelled erecting portion 52. The central portion is a generally smooth arc while the erecting portion has a trough 53 that is effectively complementary to the aforedescribed flange 48. The height of the flange and the depth of the trough are proportioned to accommodate the faired cable which is to be handled by the device.

For example, the width of the trough 52 should be slightly larger than the width of the fairing and of the same general configuration while the bottom of the trough should accommodate, without excessive wear and friction the nose portion of the cable. Similarly the flange 48 should be of sufficient height to easily deflect the fairing as it is being hauled aboard. Additionally, it should be noted that the surface contact between the guiding device 22 and the faired cable takes place under a condition of relatively high pressure and force depending on the cable tension and the angle of the cable. In this regard, it has been found that a smooth, low friction surface is highly desirable, as for example, one such as nylon, Teflon or any suitable plastic. On the other hand, the device must have structural strength so that by providing a strength member such as one of steel, aluminum, etc., which is provided with a plastic surface, has also been satisfactory. The device has been fabricated of materials consisting of plastic resins plus reinforcing filaments or woven fabrics and known as reinforced plastics. Specifically, a woven glass fiber with epoxy has proved to provide both the structural strength and rigidity as well as a low coefficient of friction.

Summarizing the physical operation of the embodiment of the invention, it is clear that as the faired cable leaves the water the fairing 13 itself will depend from the cable or wire rope 14 since it is rotatably affixed thereto. The fairing in this position strikes the flange or hump 48 of guiding device 22 and is deflected to either side thereof with the traling edge 54 furthest from the flange 48 and the strength member 14 or rope proxmate the center of the device. The rope and fairing remain in the same relative flat disposition against the central portion until they contact the trough portion 52 wherein the rope descends into the base of the trough and the fairing is erected thereabove. The faired cable exits the far end 55 in a generally fully erected position and is maintained thereby in its transport to the storaged rum by guide trough 35.

Although an exact contour definition of the guiding device 22 is quite difficult in ordinary terminology, a semi-mathematical descriptiton is as follows: It is a double-curved surface describing a cycloidal-helicoid. That is, sidewise it is relatively cycloidal while the transverse cross-section conforms to a helix.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:
1. A device for erecting and guiding a faired towing cable for storage on a drum, said device comprising:
   a generally arcuate elongated guiding member having an operating surface defined by an initial upstanding deflecting portion, an intermediate arcuate portion and a channelled erecting portion distal said deflecting portion, and
   means affixed to said member for retaining the length of said member in the direction longitudinal of said faired cable, for yielding rotation of said member about approximately the center thereof in the plane of said cable and in a plane transverse thereto,
   whereby when said towing cable is retrieved from the water it will be disposed in a position with the cable upright and said fairing depending therefrom, and as said faired cable is hauled up, said fairing will be then deflected by said initial portion of said member into a lying position and subsequently erected in passing through said channelled portion so as to permit storage.
2. The device according to claim 1, wherein said continuous operating surface is a cycloidal helicoid.
3. The device according to claim 2, wherein said supporting means includes a pair of pivots each having a spring element for yielding opposing rotation of said member.

4. The device according to claim 3, wherein said spring elements are elastomeric torsion springs.

5. The device according to claim 4, further including transport means for imparting motion transverse to said plane of said faired cable to said support structure as said cable is retrieved to permit level winding thereof on said drum.

References Cited

UNITED STATES PATENTS

| | | | |
|---|---|---|---|
| 3,224,406 | 12/1965 | Clark | 114—235 |
| 3,304,364 | 2/1967 | Hetherington | 114—235 |

EVON C. BLUNK, *Primary Examiner.*

H. C. HORNSBY, *Examiner.*